(12) United States Patent
Peng et al.

(10) Patent No.: US 11,550,142 B1
(45) Date of Patent: Jan. 10, 2023

(54) REFLECTIVE EYEPIECE OPTICAL SYSTEM AND HEAD-MOUNTED NEAR-TO-EYE DISPLAY DEVICE

(71) Applicant: Shenzhen NED Optics Co., Ltd, Shenzhen (CN)

(72) Inventors: Huajun Peng, Shenzhen (CN); Hongpeng Cao, Shenzhen (CN); Jianfei Guo, Shenzhen (CN)

(73) Assignee: Shenzhen NED Optics Co., Ltd, Shenzhen (CN)

( * ) Notice: Subject to any disclaimer, the term of this patent is extended or adjusted under 35 U.S.C. 154(b) by 0 days.

(21) Appl. No.: 17/879,185

(22) Filed: Aug. 2, 2022

(30) Foreign Application Priority Data

Aug. 2, 2021 (CN) .......................... 202110879670.5

(51) Int. Cl.
*G02B 25/00* (2006.01)
*G06F 1/16* (2006.01)
*G02B 17/08* (2006.01)

(52) U.S. Cl.
CPC ........... *G02B 25/001* (2013.01); *G02B 17/08* (2013.01); *G06F 1/163* (2013.01)

(58) Field of Classification Search
CPC ........ G02B 25/001; G02B 17/08; G06F 1/163
See application file for complete search history.

(56) References Cited

U.S. PATENT DOCUMENTS

2012/0162549 A1* 6/2012 Gao ....................... G02B 6/003
359/651

FOREIGN PATENT DOCUMENTS

| CN | 104635333 A | 5/2015 |
| CN | 105917267 A | 8/2016 |
| CN | 207318847 U | 5/2018 |
| CN | 110873967 A | 3/2020 |
| CN | 211318883 U | 8/2020 |
| CN | 213069354 U | 4/2021 |

* cited by examiner

*Primary Examiner* — James C. Jones
(74) *Attorney, Agent, or Firm* — Nitin Kaushik

(57) ABSTRACT

The present invention relates to a reflective eyepiece optical system and a head-mounted near-to-eye display device. The system includes: a first lens group, and a first optical element and a second lens group for transmitting and reflecting a light from a miniature image displayer; the second lens group includes one optical reflection surface which is an optical surface farthest from a human eye viewing side in the second lens group; the optical reflection surface is concave to a human eye viewing direction; the first optical element reflects the light refracted by the first lens group to the second lens group, and then transmits the light refracted, reflected and then refracted by the second lens group to human eyes; and the focal length combination among respective lenses is negative, positive and positive.

18 Claims, 16 Drawing Sheets

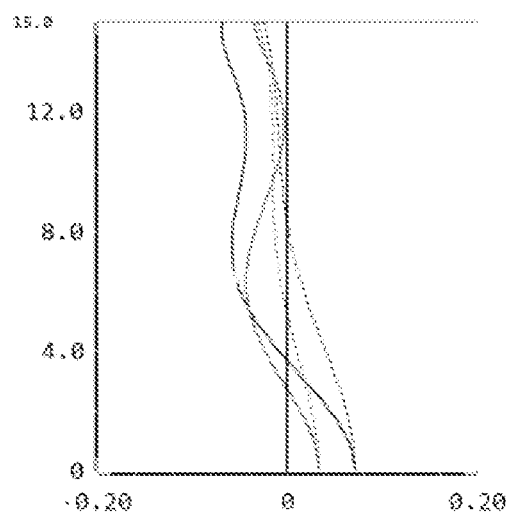
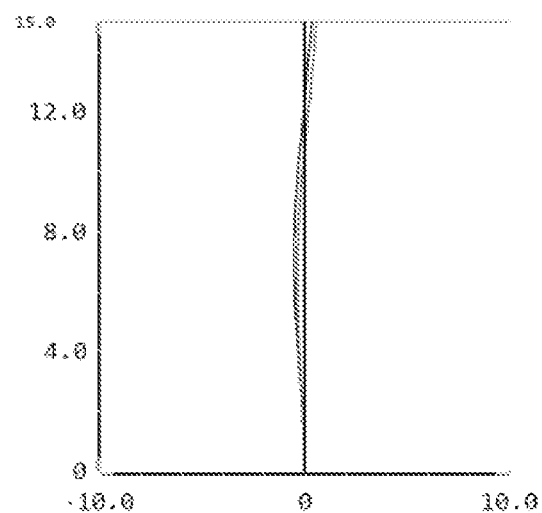
FIG. 3a
FIG. 3b

REFLECTIVE EYEPIECE OPTICAL SYSTEM AND HEAD-MOUNTED NEAR-TO-EYE DISPLAY DEVICE

CROSS-REFERENCE TO RELATED APPLICATIONS

The application claims priority to Chinese patent application No. 202110879670.5, filed on Aug. 2, 2021, the entire contents of which are incorporated herein by reference.

TECHNICAL FIELD

The present invention relates to the field of optical technology, and more particularly, to a reflective eyepiece optical system and a head-mounted near-to-eye display device.

BACKGROUND

With the development of electronic devices to ultra-miniaturization, head-mounted display devices and products are constantly emerging in military, industrial, medical, educational, consumption and other fields, and in a typical wearable computing architecture, a head-mounted display device is a key component. The head-mounted display device directs the video image light emitted from a miniature image displayer (e.g., a transmissive or reflective liquid crystal displayer, an organic electroluminescent element, or a DMD element) to the pupil of the user by optical technology to implement virtual magnified images in the near-eye range of the user, so as to provide the user with intuitive, visual images, video, text information. The eyepiece optical system is the core of the head-mounted display device, which realizes the function of displaying a miniature image in front of human eyes to form a virtual magnified image.

The head-mounted display device develops in the direction of compact size, light weight, convenient wearing, and load reduction. Meanwhile, a large field-of-view angle and visual comfort experience have gradually become key factors to evaluate the quality of the head-mounted display device. The large field-of-view angle determines a visual experience effect of high liveness, and high image quality and low distortion determine the comfort of visual experience. To meet these requirements, the optical system should try its best to achieve such indexes as a large field-of-view angle, high image resolution, low distortion, small field curvature, and a small volume. It is a great challenge for system design and aberration optimization to satisfy the above optical properties at the same time.

In Patent Document 1 (Chinese Patent Publication No. CN101915992A), Patent Document 2 (Chinese Patent Publication No. CN211698430U), Patent Document 3 (Chinese Patent Publication No. CN106662678A), and Patent Document 4 (Chinese Patent Publication No. CN105229514A), a reflective optical system utilizing a combination of traditional optical spherical surfaces and even-order aspherical face shapes is provided respectively, wherein Patent Document 1 adopts a relay scheme, but this scheme adopts a free-form surface reflection means, which greatly increases the difficulty of realizing the entire optical system; the optical systems in the Patent Document 2, Patent Document 3 and Patent Document 4 use reflective optical systems, but the basic optical structures vary greatly from one to another due to different application fields, such as in terms of a matching relationship between a lens face shape and a gap between the lenses.

Patent Document 5 (Chinese Patent Publication No. CN207081891U) and Patent Document 6 (Chinese Patent Publication No. CN108604007A) provide an eyepiece optical system that adopts a reflex means, which ensures high-quality imaging; however its optical structure is often limited to single lens reflection, thereby greatly limiting a performance ratio of the entire optical structure.

To sum up, the existing optical structures not only have problems such as heavy weight, small field-of-view angle, and insufficient optical performance, but also have problems such as difficulty in processing and mass production due to the difficulty of implementation.

SUMMARY

The technical problem to be solved by the present invention is that the existing optical structure has the problems of heavy weight, low image quality, distortion, insufficient field-of-view angle, and difficulty in mass production. Aiming at the aforementioned defects of the prior art, a reflective eyepiece optical system and a head-mounted near-to-eye display device are provided.

The technical solutions adopted in the present invention to solve the technical problem thereof are as follows: constructing a reflective eyepiece optical system, which includes a first lens group, and a first optical element and a second lens group for transmitting and reflecting light from a miniature image displayer; the second lens group includes an optical reflection surface which is an optical surface farthest from a human eye viewing side in the second lens group; the optical reflection surface is concave to the human eye viewing side; the first optical element reflects the light refracted by the first lens group to the second lens group, and then transmits the light refracted, reflected and then refracted by the second lens group to the human eyes;

an effective focal length of the eyepiece optical system is $f_w$, an effective focal length of the first lens group is $f_1$, an effective focal length of the second lens group is $f_2$, and $f_w$, $f_1$, and $f_2$ satisfy the following relations (1) and (2):

$$f_1/f_w < -0.50 \quad (1);$$

$$f_2/f_w < -0.70 \quad (2);$$

the first lens group includes a first sub-lens group and a second sub-lens group arranged coaxially and successively along an optical axis direction from the human eye viewing side to the miniature image displayer side; an effective focal length of the first sub-lens group is $f_{11}$, which is a positive value; an effective focal length of the second sub-lens group is $f_{12}$, which is a positive value; and $f_{11}$, $f_{12}$ and $f_1$ satisfy the following relationals (3) and (4):

$$0.66 < f_{11}/f_1 \quad (3);$$

$$0.57 < f_{12}/f_1 \quad (4);$$

the first sub-lens group is composed of two lenses which are a first lens away from the miniature image displayer side and a second lens close to the miniature image displayer side respectively; the first lens is a negative lens; and the second lens is a positive lens.

Further, the distance along the optical axis between the first optical element and the second lens group is $d_1$, the distance along the optical axis between the first optical element and the first lens group is $d_2$, and $d_1$ and $d_2$ satisfy the following relation (5):

$$0.69 < d_2/d_1 \quad (5).$$

Further, a maximum effective optical caliber of the second lens group is $\varphi_2$, which satisfies the following relation (6):

$$\varphi_2 < 70mm \tag{6}$$

Further, an effective focal length of the first lens is $f_{111}$, the effective focal length of the first sub-lens group is $f_{11}$, and $f_{111}$ and $f_{11}$ satisfy the following relation (7):

$$f_{111}/f_{11} < -0.96 \tag{7}$$

Further, the second sub-lens group includes a third lens adjacent to the first sub-lens group; the third lens is a positive lens; an optical surface of the third lens close to the miniature image displayer side is concave to a miniature image displayer direction; and an effective focal length of the third lens is $f_{121}$, which satisfies the following relational (8):

$$5.83 < f_{121} \tag{8}$$

Further, the second lens group includes a fourth lens adjacent to the first optical element; and the optical reflection surface is located on an optical surface of the fourth lens away from the human eyes.

Further, the second lens group includes a fourth lens and fifth lens adjacent to the first optical element; the fourth lens and the fifth lens are arranged sequentially along an incident direction of the optical axis of the human eyes; and the optical reflection surface is located on an optical surface of the fourth lens away from the human eyes.

Further, an effective focal length of the optical reflection surface is $f_{S2}$, which satisfies the following relation (9):

$$0.46 \leq f_{S2}/f_2 \leq 1.0 \tag{9}$$

Further, the first optical element is a planar transflective optical element, and a reflectivity of the first optical element is $Re_1$, which satisfies relation (10):

$$20\% < Re_1 < 80\% \tag{10}$$

Further, a reflectivity of the optical reflection surface is $Re_2$, which satisfies relation (11):

$$20\% < Re_2 \tag{11}$$

Further, the effective focal length $f_1$ of the first lens group, the effective focal length $f_{11}$ of the first sub-lens group, the effective focal length $f_{12}$ of the second sub-lens group and the effective focal length $f_{111}$ of the first lens further satisfy the following relations (12), (13) and (14):

$$0.67 \leq f_{11}/f_1 \leq 1.42 \tag{12};$$

$$-2.64 \leq f_{111}/f_{11} \leq -0.97 \tag{13};$$

$$0.58 \leq f_{12}/f_1 \leq 4.54 \tag{14}$$

Further, an included angle of the optical axis between the first lens group and the second lens group is $\lambda_1$, which satisfies relation (15):

$$55° < \lambda_1 < 120° \tag{15}$$

Further, the eyepiece optical system further includes a planar reflective optical element located between the first lens group and the first optical element; the planar reflective optical element reflects the light refracted by the first lens group to the first optical element, and the first optical element reflects the light to the second lens group, and then transmits the light refracted, reflected and then refracted by the second lens group to the human eyes;

an included angle between the first lens group and the first optical element is $\lambda_2$, which satisfies the following relation (17):

$$60° \leq \lambda_2 \leq 180° \tag{17}$$

Further, the first lens group includes one or more even-order aspherical face shapes; the optical surfaces of the fourth lens are all even-order aspherical face shapes; and the optical reflection surface is an even-order aspherical face shape.

Further, the even-order aspherical face shape satisfies the following relation (16):

$$z = \frac{cr^2}{1 + \sqrt{1 - (1+k)c^2 r^2}} + a_2 r^2 + a_4 r^4 + a_6 r^6 + \ldots \tag{16}$$

Further, the material of each lens in the second lens group is an optical plastic material.

The present application provides a head-mounted near-to-eye display device, including a miniature image displayer, and further including the reflective eyepiece optical system according to any one of the foregoing content; and the eyepiece optical system is located between the human eyes and the miniature image displayer.

Further, the miniature image displayer is an organic electroluminescent device.

Further, the head-mounted near-to-eye display device includes two identical reflective eyepiece optical systems.

The present invention has following beneficial effects: the first optical element and the second lens group have transmission and reflection properties, the second lens group includes a reflection surface, the eyepiece optical system composed of the first lens group, the second lens group and the first optical element is used for effectively folding the optical path, which reduces the overall size of the eyepiece optical system and improves the possibility of subsequent mass production, the first lens group includes a first sub-lens group and a second sub-lens group, and the first sub-lens group and the second sub-lens group adopt a combination of positive and positive. On the basis of miniaturization, cost and weight reduction for the article, the aberration of the optical system is greatly eliminated, and the basic optical indicators are also improved, ensuring high image quality and increasing the size of the picture angle. Thus an observer can watch large images of full frame, high definition and uniform image quality without any distortion and get visual experience of high liveness via the present invention, which is suitable for near-to-eye displays and similar devices thereof.

BRIEF DESCRIPTION OF THE DRAWINGS

In order to illustrate the embodiments of the present invention or the technical solutions in the prior art more clearly, the present invention is further illustrated in connection with accompanying drawings and embodiments hereafter. The drawings in the following description are only some embodiments of the present invention. For those of ordinary skills in the art, other drawings may be obtained from these drawings without any creative work.

FIG. 3a is a schematic diagram of a field curvature of the reflective eyepiece optical system according to Example 1 of the present invention;

FIG. 3b is a schematic diagram of a distortion of the reflective eyepiece optical system according to Example 1 of the present invention;

DETAILED DESCRIPTION OF THE PREFERRED EMBODIMENT

Figure 1:
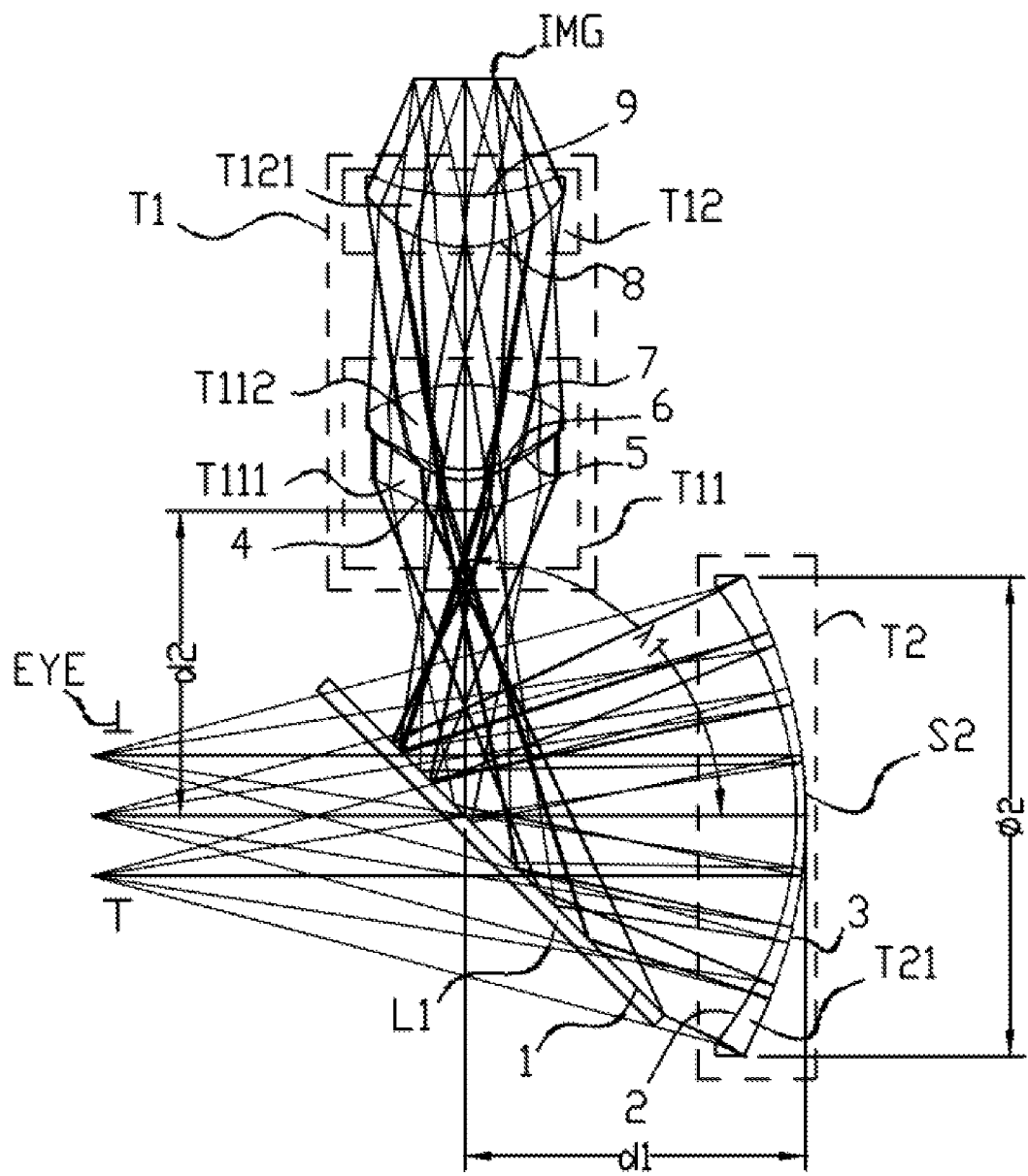
FIG. 1 is an optical path diagram of a reflective eyepiece optical system according to Example 1 of the present invention.
Figure 2:
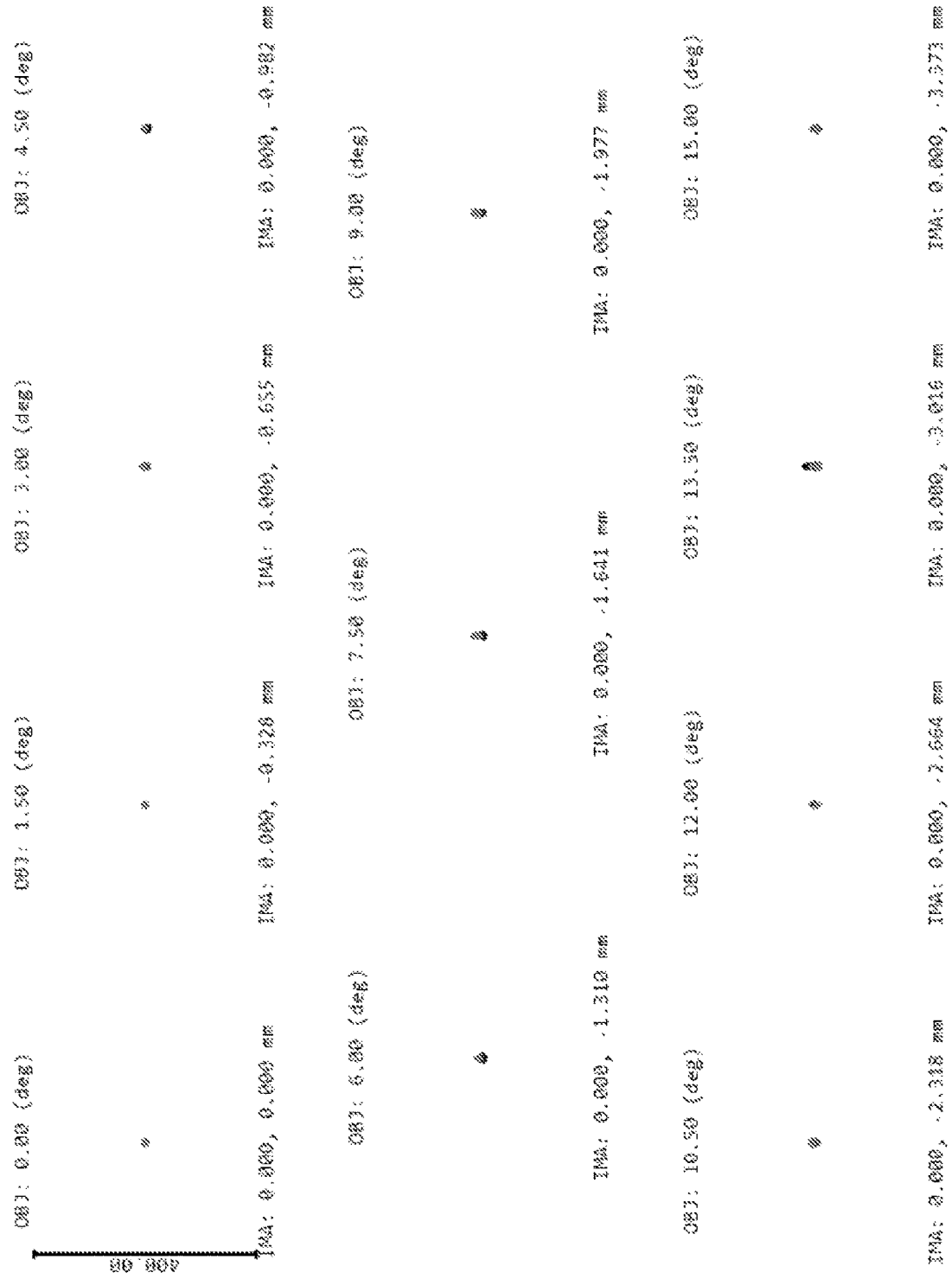
FIG. 2 is a schematic diagram of a dot array diagram of the reflective eyepiece optical system according to Example 1 of the present invention.
Figure 4:
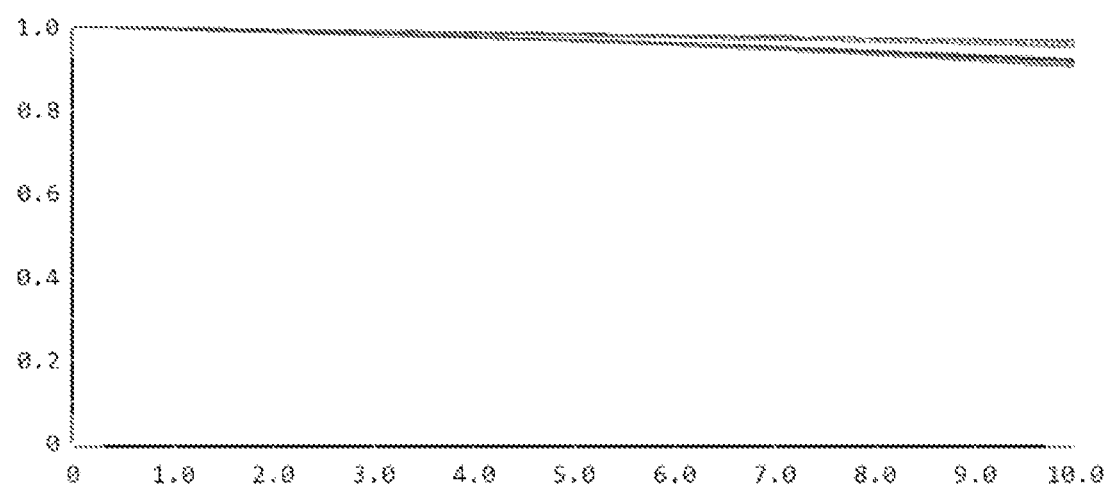
FIG. 4 is a schematic diagram of an optical transfer function (MTF) of the reflective eyepiece optical system according to Example 1 of the present invention.

In order to make the objectives, technical solutions and advantages of the embodiments of the present invention clearer, hereafter clear and complete description is made with reference to the technical solutions in the embodiments of the present invention, and the described embodiments are a part rather than all of the embodiments of the present invention. All other embodiments obtained by those of ordinary skills in the art without any creative work based on the embodiments disclosed in the present invention fall within the claimed scope of the present invention.

In the present invention, a reflective eyepiece optical system is constructed, which includes a first lens group, and a first optical element and a second lens group for transmitting and reflecting light from a miniature image displayer; the second lens group includes an optical reflection surface which is an optical surface farthest from a human eye viewing side in the second lens group; the optical reflection surface is concave to the human eye viewing side; the first optical element reflects the light refracted by the first lens group to the second lens group, and then transmits the light refracted, reflected and then refracted by the second lens group to the human eyes;

The aforementioned light transmission path is as follows: the light generated by the miniature image displayer is refracted by the first lens group and then transmitted onto the first optical element, and the reflection part on the first optical element reflects the light onto the second lens group, wherein since the optical reflection surface in the second lens group is arranged on the optical surface farthest from the human eye viewing side, the light will be refracted once in the second lens group before entering the optical reflection surface, and when it reaches the optical reflection surface, the optical reflection surface will reflect the light onto the first optical element. Before the light reflected by the optical reflection surface reaches the first optical element, it will be refracted onto the first optical element through other optical surfaces in the second lens group, and a light-transmitting part of the first optical element will transmit the light to the human eyes.

An effective focal length of the eyepiece optical system is $f_w$, an effective focal length of first lens group is $f_1$, an effective focal length of second lens group is $f_2$, and $f_w$, $f_1$, and $f_2$ satisfy the following relations (1) and (2):

$$f_1/f_w < -0.50 \qquad (1);$$

$$f_2/f_w < -0.70 \qquad (2);$$

Wherein the value of $f_1/f_w$ may be −0.50, −0.579, −1.462, −3.398, −11.295, −23.931, −30.891, −44.751, −51.535, −70.479, etc., and the value of $f_2/f_w$ may be −0.70, −0.79, −1.93, −3.59, −11.35, −31.12, −45.08, −50.91, −71.88, −80.73, −100.649, etc.

The first lens group includes a first sub-lens group and a second sub-lens group arranged coaxially and sequentially along an optical axis direction from a human eye viewing side to a miniature image displayer side; the effective focal lengths of the first sub-lens group and the second sub-lens group are a combination of positive and positive; the effective focal length of the first sub-lens group is $f_{11}$, the effective focal length of the second sub-lens group is $f_{12}$, and $f_{11}$, $f_{12}$ and $f_1$ satisfy the following relations (3) and (4):

$$0.66 < f_{11}/f_1 \qquad (3);$$

$$0.57 < f_{12}/f_1 \qquad (4);$$

wherein the value of $f_{11}/f_1$ may be 0.66, 0.79, 1.57, 3.77, 5.89, 8.35, 13.25, 25.56, 36.1, 54.1, 87.6, etc., and the value of $f_{12}/f_1$ may be 0.57, 0.575, 0.87, 1.55, 2.25, 5.33, 9.78, 12.13, 22.55, 33.15, 46.14, 54.53, 68.78, etc.

In the aforementioned relations (1), (2), (3) and (4), the ranges of the values of $f_1/f_w$, $f_2/f_w$, $f_{11}/f_1$ and $f_{12}/f_1$ are closely related to the correction of system aberration, the processing difficulty of the optical elements, and the sensitivity of assembly deviation of the optical elements, wherein the value of $f_1/f_w$ in the relation (1) is less than −0.50, which improves the machinability of the optical elements in the system; and the value of $f_2/f_w$ in the relation (2) is less than −0.70, so that the system aberration is fully corrected, thereby achieving an optical effect with higher quality. The value of $f_{11}/f_1$ in the relation (3) is greater than 0.66, so that the system aberration is fully corrected, thereby achieving high-quality optical effect; The value of $f_{13}/f_1$ in the formula (4) is greater than 0.57, so that the system aberration can be fully corrected, thereby achieving a high-quality optical effect.

The first sub-lens group is composed of two lenses which are a first lens away from the miniature image displayer side and a second lens close to the miniature image displayer side respectively; the first lens is a negative lens; and the second lens is a positive lens.

The first lens group includes two sub-lens groups, which are a first sub-lens group and a second sub-lens group arranged adjacently, and the first sub-lens group and the second sub-lens group adopt a focal length combination of positive and positive, wherein in the first lens group, the first lens is a negative lens; the second lens is a positive lens; the negative lens corrects the aberration, and the positive lens provides focused imaging. The focal length combination of the lenses is complex, which can better correct the aberration, provide better processability and lower cost, fully corrects the aberration of the system and improves the optical resolution of the system.

More importantly, with the transmission and reflection properties of the first optical element and the second lens group which includes a reflection surface, the light path is effectively folded, which reduces the overall size of the eyepiece optical system and improves the possibility of subsequent mass production. Meanwhile, the second lens group and the focal length combination relationship between the first sub-lens group and the second sub-lens group are arranged, so that the aberration is further corrected and the processability is better. Therefore, on the basis of miniaturization, cost and weight reduction for the article, the aberration of the optical system is greatly eliminated, and the basic optical indicators are also improved to ensure high imaging quality and increase the size of the picture angle. Thus an observer can watch large images of full frame, high definition and uniform image quality without any distortion and get visual experience of high liveness via the present invention, and the present article is suitable for head-mounted near-to-eye display devices and similar devices.

In the aforementioned embodiment, the first optical element may be a polarizer with 75% transmission, 25% reflection or 65% transmission, 35% reflection or having a transflective function.

As shown in FIG. 1, a first optical element, a second lens group, and a first lens group arranged along an optical axis direction between a human eye viewing side and a miniature image displayer are included; wherein the optical surface closer to a E side of the human eyes is marked as 1, and so on (2, 3, 4, 5, 6 . . . respectively from left to right), the light emitted from the miniature image displayer is refracted by the first lens group and then reflected on the first optical element to the second lens group, the second lens group refracts, reflects and then refracts the light, and then the first optical element transmits the light transmitted through the second lens group to the human eyes.

In a further embodiment, the distance along the optical axis between the first optical element and the second lens group is $d_1$, the distance along the optical axis between the first optical element and the first lens group is $d_2$, and $d_1$ and $d_2$ satisfy the following relation (5):

$$0.69 < d_2/d_1 \qquad (5);$$

wherein the value of $d_2/d_1$ may be 0.69, 0.695, 0.88, 0.98, 1.55, 2.37, 3.55, 3.88, 3.99, 4.57, 4.89, 4.99, etc.

The lower limit of $d_2/d_1$ in the aforementioned relation (5) is greater than 0.69, which reduces difficulty of correcting an off-axis aberration of the system, and ensures that both a central field-of-view and an edge field-of-view achieve high image quality, so that the image quality in the full frame is uniform.

In a further embodiment, a maximum effective optical caliber of second lens group is $\varphi_2$, which satisfies the following relation (6):

$$\varphi_2 < 70 \text{ mm} \qquad (6);$$

wherein the value of $\varphi_2$ may be 70, 69, 65, 56, 52, 48, 32, 30, 28, 26, 21, etc., and the unit is mm.

In a further embodiment, the first lens is a negative lens; the second lens is a positive lens; and an effective focal length of the first lens is $f_{111}$, which satisfies the following relation (7):

$$f_{111}/f_{11} < -0.96 \qquad (7);$$

wherein the value of $f_{111}/f_{11}$ may be −0.96, −0.97, −1.72, −2.88, −5.32, −9.55, −12.25, −23.57, −35.57, −38.79, −49.91, −60.11, etc.

The value of $f_{111}/f_{11}$ in the relation (7) is less than −0.96, which reduces the difficulty of correcting spherical aberration and facilitates the realization of a large optical aperture.

In a further embodiment, the third lens is a positive lens; an optical surface of the third lens close to the miniature image displayer side is concave to a miniature image displayer direction; an effective focal length of the third lens is $f_{121}$, which satisfies the following relational (8):

$$5.83 < f_{121} \qquad (8);$$

wherein the value of $f_{121}$ may be 5.83, 8.5, 12, 13.5, 23.8, 30.5, 39.4, 44.5, 57.9, 100.1, etc.

The value of $f_{11}/f_1$ in the relation (8) is greater than 5.83, so that the system aberration is fully corrected, thereby achieving high-quality optical effect.

The aforementioned embodiments further improves the aberrations such as astigmatism and field curvature of the system, and is beneficial for the eyepiece system to realize the high-resolution optical effect of uniform image quality in the full frame.

In a further embodiment, the second lens group further includes a fifth lens; the fourth lens and the fifth lens are arranged sequentially along the incident direction of the optical axis of the human eyes; the optical reflection surface is located on the optical surface of the fourth lens away from the human eyes; and an effective focal length of the optical reflection surface is $f_{S2}$, which satisfies the following relation (9):

$$0.46 \leq f_{S2}/f_2 \leq 1.0 \qquad (9);$$

wherein the value of $f_{S2}/f_2$ may be 0.46, 0.465, 0.467, 0.5, 0.65, 0.75, 0.87, 0.93, 0.97, 1.0, etc.

The value of $f_{S2}/f_2$ in the relation (9) is greater than 0.46, so that the system aberration is fully corrected, thereby achieving high-quality optical effect. Its value is less than 1.0, which improves the machinability of the optical elements in the system.

In a further embodiment, the first optical element is a planar transflective optical element, and a reflectivity of the first optical element is $Re_1$, which satisfies relation (10):

$$20\% < Re_1 < 80\% \quad (10)$$

wherein the value of $Re_1$ may be 20%, 21%, 30%, 47%, 52%, 60%, 65%, 70%, 79%, 80%, etc.

In a further embodiment, a reflectivity of the optical reflection surface is $Re_2$, which satisfies relation (11):

$$20\% < Re_2 \quad (11);$$

wherein the value of $Re_2$ may be 20%, 21%, 30%, 47%, 52%, 60%, 65%, 70%, 80%, 99%, etc.

In a further embodiment, the effective focal length $f_1$ of the first lens group, the effective focal length $f_{11}$ of the first sub-lens group, the effective focal length $f_{12}$ of the second sub-lens group and the effective focal length $f_{111}$ of the first lens further satisfy the following relations (12), (13) and (14):

$$0.67 \leq f_{11}/f_1 \leq 1.42 \quad (12);$$

$$-2.64 \leq f_{111}/f_{11} \leq -0.97 \quad (13);$$

$$0.58 \leq f_{12}/f_1 \leq 4.54 \quad (14).$$

The value of $f_{11}/f_1$ may be 0.67, 0.81, 0.98, 1.235, 1.255, 1.354, 1.367, 1.399, 1.413, 1.42, etc., the value of $f_{111}/f_{11}$ may be −2.64, −2.55, −2.34, −2.22, −2.18, −1.88, −1.68, −1.57, −0.97, etc., and the value of $f_{12}/f_1$ may be 0.58, 0.963, 1.99, 2.145, 2.548, 3.354, 4.361, 4.54, etc.

By further optimizing the value ranges of the effective focal lengths of the first sub-lens group, the second sub-lens group, the third sub-lens group and the system, the optical performance and difficulty of processing and manufacturing of the optical system are better balanced.

In a further embodiment, an included angle of the optical axis between the first lens group and the second lens group is $\lambda_1$, which satisfies relation (15):

$$55° < \lambda_1 < 120° \quad (15);$$

wherein the value of $\lambda_1$ may be 55°, 60°, 66°, 70°, 90°, 100°, 115°, 120°, etc.

In a further embodiment, the eyepiece optical system further includes a planar reflection optical element located between the first lens group and the first optical element; the planar reflective optical element reflects the light refracted by the first lens group onto the first optical element, and the first optical element reflects the light into the second lens group, and then transmits the light refracted, reflected and then refracted by the second lens group to the human eyes; an included angle between the first lens group and the first optical element is $\lambda_2$, which satisfies the following relation (17):

$$60° \leq \lambda_2 \leq 180° \quad (17);$$

wherein the value of $\lambda_2$ may be 60°, 80°, 90°, 100°, 130°, 140°, 155°, 167°, 180°, etc.

In a further embodiment, the first lens group includes one or more even-order aspherical face shapes; the optical surfaces of the fourth lens are all even-order aspherical face shapes; and the optical reflection surface is an even-order aspherical face shape.

The aberrations at all levels of the optical system are further optimized and corrected. The optical performance of the eyepiece optical system is further improved.

In a further embodiment, the even-order aspherical face shape satisfies the following relation (16):

$$z = \frac{cr^2}{1 + \sqrt{1 - (1+k)c^2r^2}} + a_2 r^2 + a_4 r^4 + a_6 r^6 + \ldots \quad (16)$$

wherein z is a vector height of the optical surface, c is a curvature at an aspherical vertex, k is an aspherical coefficient, $\alpha 2, 4, 6 \ldots$ are coefficients of various orders, and r is a coordinate of the distance from a point on a curved surface to an optical axis of a lens system.

The aberrations of the optical system (including spherical aberration, coma, distortion, field curvature, astigmatism, chromatic aberration and other higher-order aberrations) are fully corrected, which is beneficial for the eyepiece optical system to further improve the image quality of the central field-of-view and the edge field-of-view, reduce the image quality difference between the central field-of-view and the edge field-of-view, and achieve more uniform image quality and low distortion in the full frame, while realizing a large field-of-view angle and a large aperture.

In a further embodiment, the material of each lens in the second lens group is an optical plastic material, such as E48R, EP5000, OKP1, etc.

The aberrations at all levels of the eyepiece optical system are fully corrected, while the manufacturing cost of the optical element and the weight of the optical system are controlled.

The principles, solutions and display results of the aforementioned eyepiece optical system will be further described below through more specific examples.

In the following examples, the diaphragm E may be the exit pupil of imaging for the eyepiece optical system, which is a virtual light exit aperture. When the pupil of the human eyes is at the diaphragm position, the best imaging effect can be observed.

Example 1

The eyepiece design data of Example 1 is shown in Table 1 below:

TABLE 1

| | | | Lens | | | |
|---|---|---|---|---|---|---|
| Surface | Curvature radius (mm) | Thickness (mm) | Refractive index | Abbe number | Net caliber (mm) | Cone coefficient |
| Diaphragm | Infinity | 32 | | | 5 | |
| 2 | Infinity | 15.15862 | | | 25.14875 | |
| 3 | −24.58112 | 0.6139226 | 1.6516 | 58.416296 | 30.44279 | |
| 4 | −36.00483 | −0.6139226 | | reflection | 32.09276 | 0.1064971 |
| 5 | −24.58112 | −22.15862 | | | 30.13413 | |
| 6 | Infinity | 20.369348 | | reflection | 37.86804 | |
| 7 | 18.21567 | 1.998846 | 1.64219 | 22.408848 | 12.30829 | −22.14939 |

TABLE 1-continued

| Surface | Curvature radius (mm) | Thickness (mm) | Lens Refractive index | Abbe number | Net caliber (mm) | Cone coefficient |
|---|---|---|---|---|---|---|
| 8 | 3.083193 | 0.7190639 | | | 12.48345 | −1.125975 |
| 9 | 4.000298 | 5.703381 | 1.4565 | 90.269745 | 12.86089 | −1.349327 |
| 10 | −23.75155 | 9.230001 | | | 13.19566 | 3.717332 |
| 11 | 7.869617 | 3.41728 | 1.61117 | 55.812649 | 13.3041 | |
| 12 | 15.91579 | 7.936633 | | | 12.43785 | |
| Image plane | Infinity | | | | 6.754095 | |

FIG. 1 is an optical path diagram of the optical system of Example 1, which includes a first lens group T1, and a first optical element L1 and a second lens group T2 for transmitting and reflecting light from a miniature image displayer IMG; the second lens group T2 includes an optical reflection surface S2 which is an optical surface farthest from a human eye viewing side in the second lens group T2; the optical reflection surface S2 is concave to the human eye viewing side; the first optical element L1 reflects the light refracted by the first lens group T1 to the second lens group T2, and then transmits the light refracted, reflected and then refracted by the second lens group T2 to the human eyes EYE.

The effective focal length $f_w$ of the eyepiece optical system is −12.49, the effective focal length $f_{S2}$ of the optical reflection surface S2 is 9.77, the effective focal length $f_1$ of the first lens group T1 is 12.78, the effective focal length $f_2$ of the second lens group L2 is 8.87, the distance di along the optical axis between the first optical element L1 and the second lens group T2 is 22.08, and the distance $d_2$ along the optical axis between the first optical element L1 and the first lens group T1 is 15.45, wherein the first lens group T1 includes a first sub-lens group T11 and a second sub-lens group T12, both the first sub-lens group T11 and the second sub-lens group T12 are positive lens groups, and the first sub-lens group T11 is composed of two lenses which are a first lens T111 away from the miniature image displayer IMG side and a second lens T112 close to the miniature image displayer IMG side; and the first lens T111 is a negative lens, and the second lens T112 is a positive lens. The second sub-lens group T12 is composed of one lens, wherein the second sub-lens group T12 includes a third lens T121 adjacent to the first sub-lens group T11; and the third lens T121 is a positive lens. The second lens group T2 is composed of one lens, the second lens group T2 includes a fourth lens T21, and an optical reflection surface S2 is located on the optical surface of the fourth lens T21 away from the human eyes EYE.

An effective focal length $f_{11}$ of the first sub-lens group T11 is 8.56, an effective focal length $f_{111}$ of the first lens T111 is −23.57, and an effective focal length $f_{12}$ of the second sub-lens group T12 is 21.94. Then $f_1/f_w$ is −1.02, $f_2/f_w$ is −0.71, $f_{11}/f_1$ is 0.67, $f_{111}/f_{11}$ is −2.75, $f_{12}/f_1$ is 1.12, $f_{121}$ is 21.94, $f_{S2}/f_2$ is 0.496, $d_2/d_1$ is 0.7, and $\lambda_1$ is 90°.

FIGS. 2, 3a, 3b and 4 are respectively a dot array diagram, a field curvature diagram, a distortion diagram and a transfer function MTF curve graph, which reflect that the lights of respective view fields in this example has high resolution and small optical distortion in the unit pixel of the image plane (the miniature image displayer IMG), the resolution per 10 mm per unit period reaches more than 0.9, the aberration of the optical system and the image drift are well corrected, and a display image of uniformity and high optical performance can be observed through the eyepiece optical system.

Example 2

The eyepiece design data of Example 2 is shown in Table 2 below:

TABLE 2

| Surface | Curvature radius (mm) | Thickness (mm) | Lens Refractive index | Abbe number | Net caliber (mm) | Cone coefficient |
|---|---|---|---|---|---|---|
| Diaphragm | Infinity | 32 | | | 5 | |
| 2 | Infinity | 14.45817 | | | 25.14875 | |
| 3 | −24.62477 | 0.9997475 | 1.6516 | 58.416296 | 30.13759 | |
| 4 | −35.77772 | −0.9997475 | | reflection | 32.03633 | 0.5661455 |
| 5 | −24.62477 | −18.45817 | | | 29.77836 | |
| 6 | Infinity | 23.369348 | | reflection | 36.9776 | |
| 7 | 17.36994 | 1.995745 | 1.6421 | 22.408848 | 12.23538 | −20.74811 |
| 8 | 3.070585 | 0.7380514 | | | 12.39251 | −1.109099 |
| 9 | 4.041002 | 5.647009 | 1.4565 | 90.269745 | 12.77381 | −1.337447 |
| 10 | −24.34919 | 9.127345 | | | 13.10295 | 3.786127 |
| 11 | 7.83985 | 3.297791 | 1.6111 | 55.812649 | 13.20853 | |
| 12 | 15.16458 | 8.17181 | | | 12.3694 | |
| Image plane | Infinity | | | | 6.850308 | |

Figure 5:
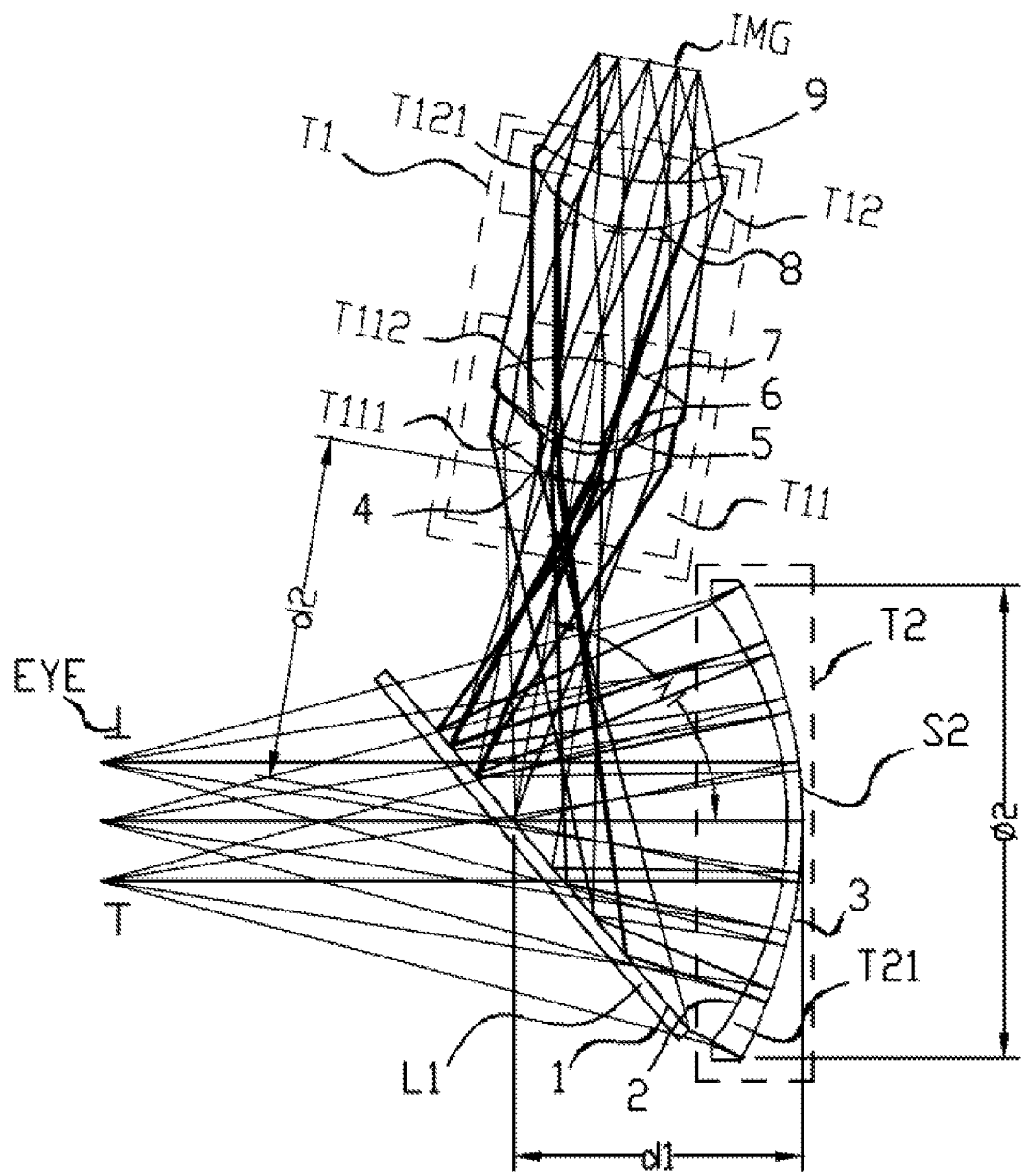
FIG. 5 is an optical path diagram of a reflective eyepiece optical system according to Example 2 of the present invention.
Figure 6:
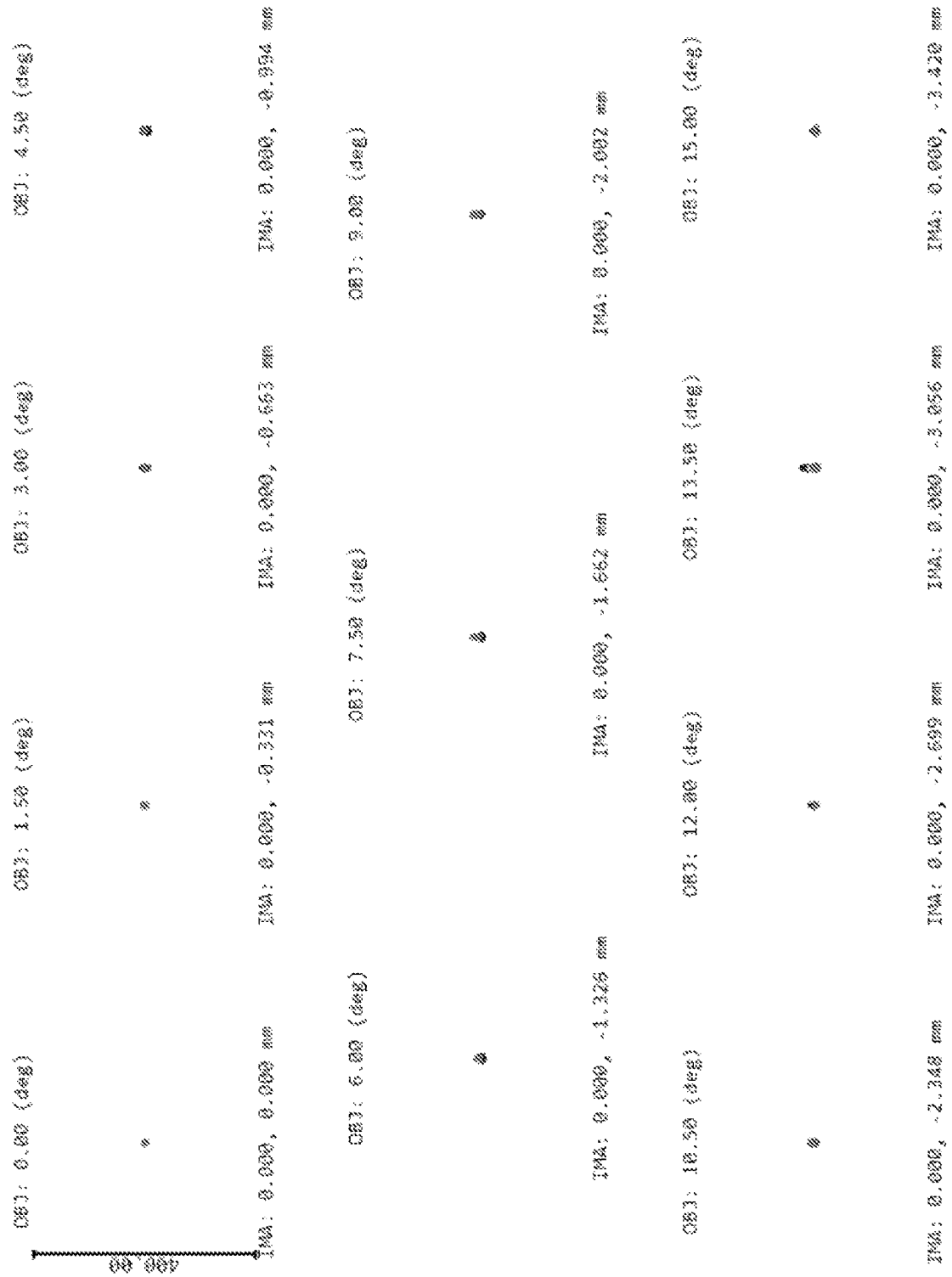
FIG. 6 is a schematic diagram of a dot array diagram of the reflective eyepiece optical system according to Example 2 of the present invention.
Figure 7A:
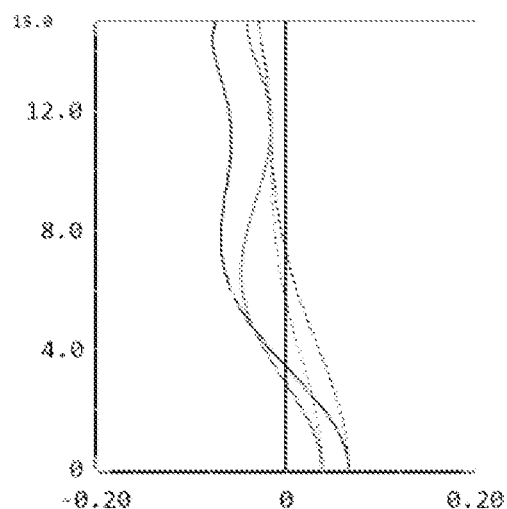
FIG. 7a is a schematic diagram of a field curvature of the reflective eyepiece optical system according to Example 2 of the present invention.
Figure 7B:
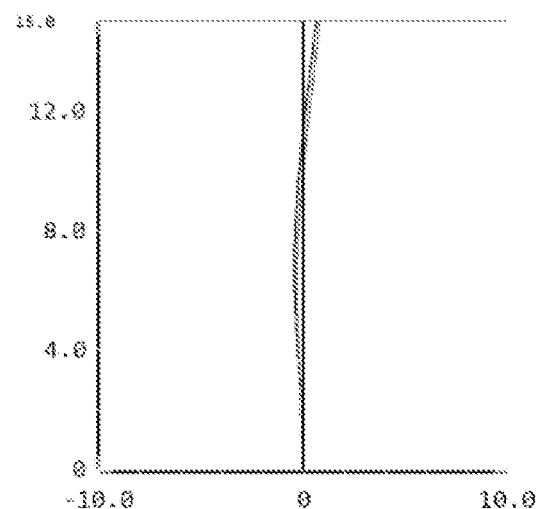
FIG. 7b is a schematic diagram of a distortion of the reflective eyepiece optical system according to Example 2 of the present invention.
Figure 8:
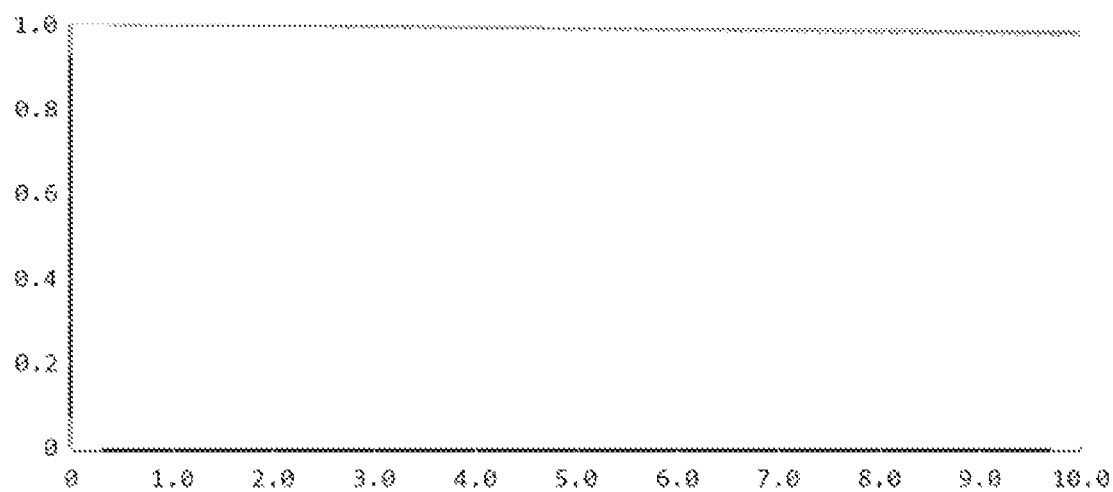
FIG. 8 is a schematic diagram of an optical transfer function (MTF) of the reflective eyepiece optical system according to Example 2 of the present invention.

FIG. 5 is an optical path diagram of the optical system of Example 2, which includes a first lens group T1, and a first optical element L1 and a second lens group T2 for transmitting and reflecting light from a miniature image displayer IMG; the second lens group T2 includes an optical reflection surface S2 which is an optical surface farthest from a human eye viewing side in the second lens group T2; the optical reflection surface S2 is concave to the human eye viewing side; the first optical element L1 reflects the light refracted by the first lens group T1 to the second lens group T2, and then transmits the light refracted, reflected and then refracted by the second lens group T2 to the human eyes EYE.

The effective focal length $f_w$ of the eyepiece optical system is −12.64, the effective focal length $f_1$ of the first lens group T1 is 12.71, the effective focal length $f_2$ of the second lens group T2 is 19.44, the effective focal length $f_{S2}$ of the optical reflection surface S2 is 9.81, the distance di along the optical axis between the first optical element L1 and the second lens group T2 is 19.46, and the distance $d_2$ along the optical axis between the first optical element L1 and the first lens group T1 is 25.37, wherein the first lens group T1 includes a first sub-lens group T11 and a second sub-lens group T12, both the first sub-lens group T11 and the second sub-lens group T12 are positive lens groups, and the first sub-lens group T11 is composed of two lenses which are a first lens T111 away from the miniature image displayer IMG side and a second lens T112 close to the miniature image displayer IMG side; and the first lens T111 is a negative lens, and the second lens T112 is a positive lens. The second sub-lens group T12 is composed of one lens, wherein the second sub-lens group T12 includes a third lens T121 adjacent to the first sub-lens group T11; and the third lens T121 is a positive lens.

An effective focal length $f_{11}$ of the first sub-lens group T11 is 15.09, an effective focal length $f_{111}$ of the first lens T111 is −14.64, and an effective focal length $f_{12}$ of the second sub-lens group T12 is 22.68; the second lens group T2 is composed of one lens which is a fourth lens T21, and an optical reflection surface S2 is located on the optical surface of the fourth lens T21 away from the human eyes. The effective focal length $f_{21}$ of the fourth lens T21 is 19.44. Then $f_1/f_w$ is −1.01, $f_2/f_1$ is −1.54, $f_{111}/f_1$ is 1.19, $f_{111}/f_{11}$ is −0.97, $f_{12}/f_1$ is 1.17, $f_{121}$ is 22.68, $d_2/d_1$ is 1.32, $f_{S2}/f_2$ is 0.505, and $\lambda_1$ is 80°.

FIGS. 6, 7*a*, 7*b* and 8 are respectively a dot array diagram, a field curvature diagram, a distortion diagram and a transfer function MTF curve graph, which reflect that the lights of respective view fields in this example has high resolution and small optical distortion in the unit pixel of the image plane (the miniature image displayer IMG), the resolution per 10 mm per unit period reaches more than 0.9, the aberration of the optical system and the image drift are well corrected, and a display image of uniformity and high optical performance can be observed through the eyepiece optical system.

Example 3

The eyepiece design data of Example 3 is shown in Table 3 below:

TABLE 3

| Surface | Lens | | | | | |
|---|---|---|---|---|---|---|
| | Curvature radius (mm) | Thickness (mm) | Refractive index | Abbe number | Net caliber (mm) | Cone coefficient |
| Diaphragm | Infinity | 32 | | | 5 | |
| 2 | 71.28546 | 1.008382 | 1.5168 | 64.167336 | 25.7784 | |
| 3 | 72.30057 | 14.21511 | | | 25.99265 | |
| 4 | −24.67017 | 0.9999106 | 1.6516 | 58.416296 | 30.20215 | |
| 5 | −35.81928 | −0.9999106 | | reflection | 32.10354 | 0.5757379 |
| 6 | −24.67017 | −14.21511 | | | 29.83894 | |
| 7 | 72.30057 | −1.008382 | 1.5168 | 64.167336 | 22.10188 | |
| 8 | 71.28546 | −7 | | | 21.64196 | |
| 9 | Infinity | 20.369348 | | reflection | 13.92036 | |
| 10 | 17.40413 | 1.996532 | 1.642 | 22.408848 | 12.54317 | −20.87694 |
| 11 | 3.072977 | 0.7489444 | | | 12.64571 | −1.121024 |
| 12 | 4.058946 | 5.635743 | 1.4565 | 90.269745 | 12.94311 | −1.342479 |
| 13 | −24.28943 | 9.152547 | | | 13.22027 | 3.915728 |
| 14 | 7.865028 | 3.326812 | 1.6111 | 55.812649 | 13.25068 | |
| 15 | 15.4674 | 8.140879 | | | 12.4129 | |
| IMA | Infinity | | | | 6.83999 | |

Figure 9:
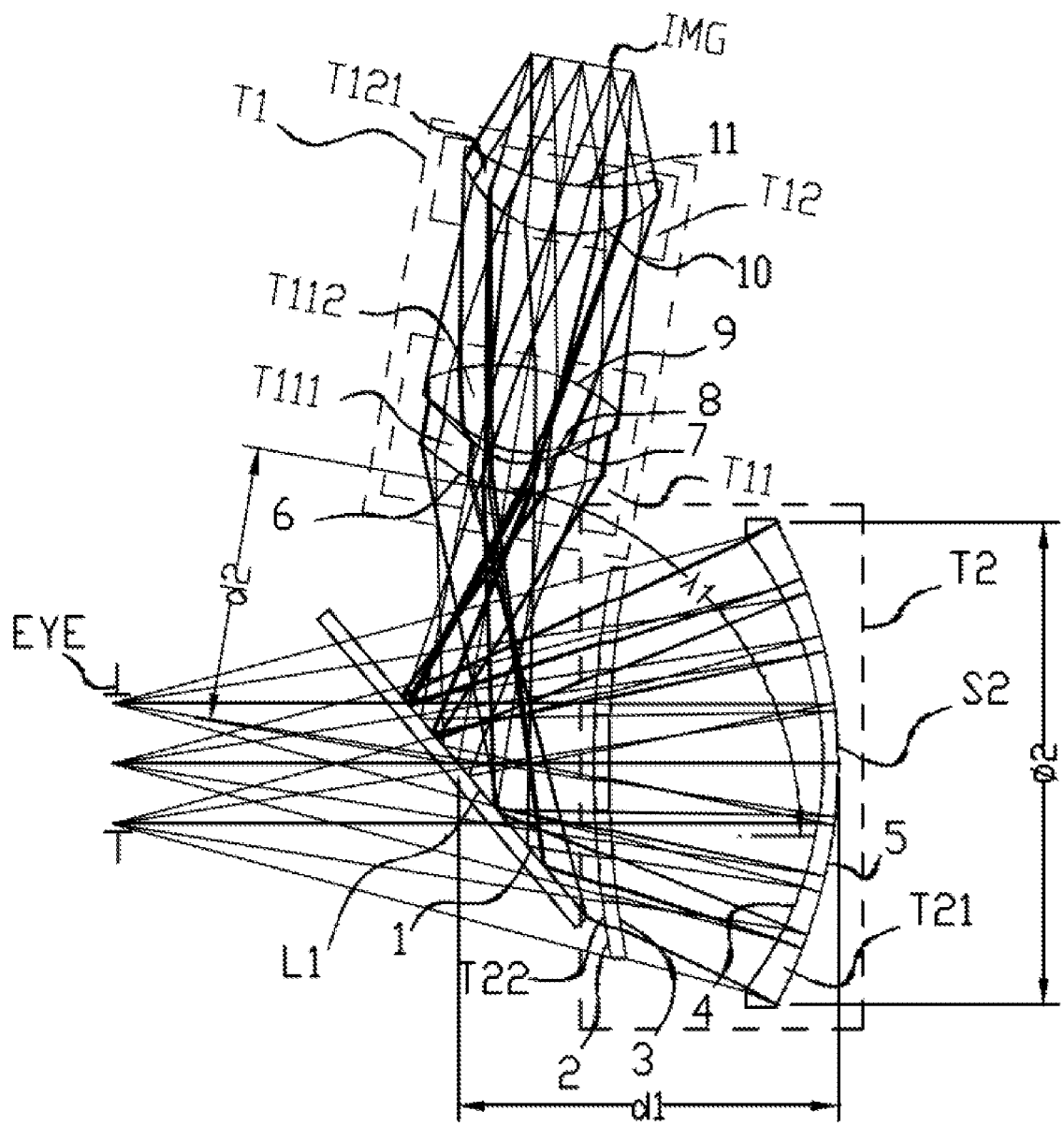
FIG. 9 is an optical path diagram of a reflective eyepiece optical system according to Example 3 of the present invention.
Figure 10:
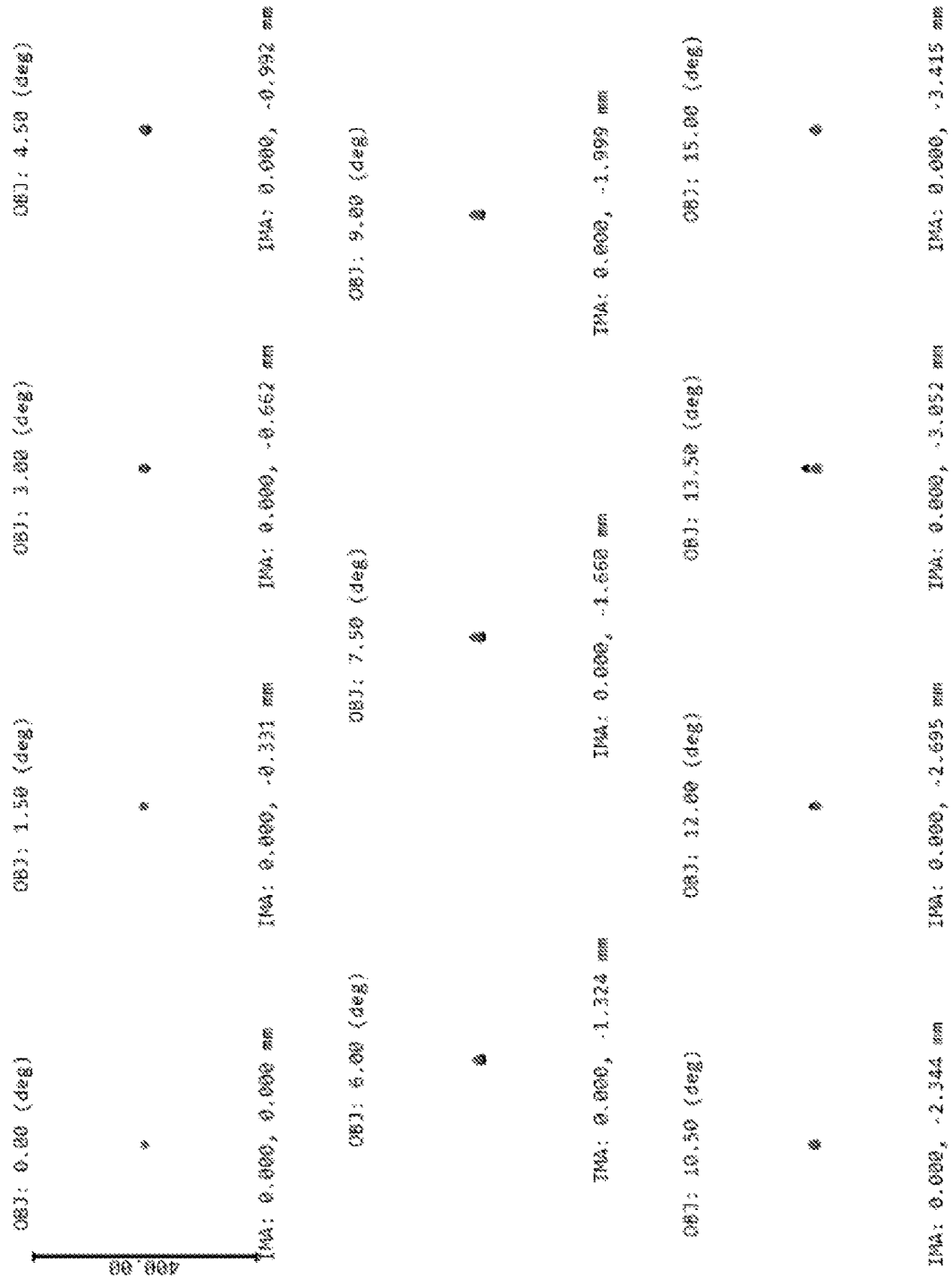
FIG. 10 is a schematic diagram of a dot array diagram of the reflective eyepiece optical system according to Example 3 of the present invention.
Figure 11A:
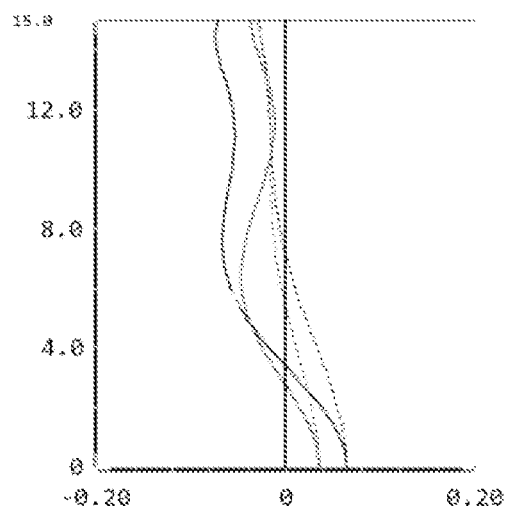
FIG. 11a is a schematic diagram of a field curvature of the reflective eyepiece optical system according to Example 3 of the present invention.
Figure 11B:
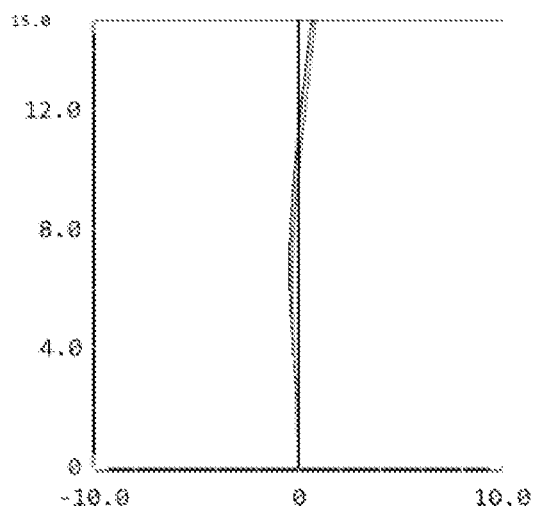
FIG. 11b is a schematic diagram of a distortion of the reflective eyepiece optical system according to Example 3 of the present invention.
Figure 12:
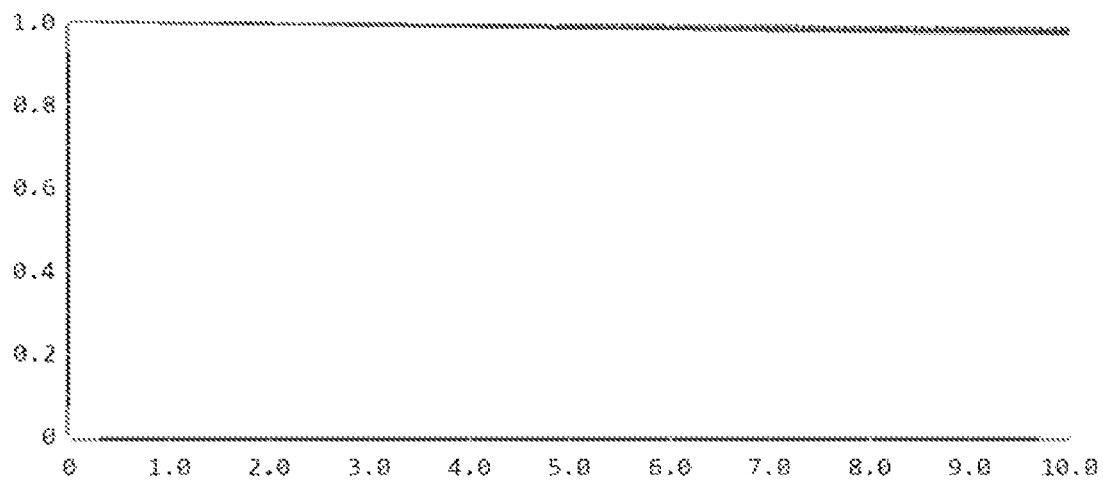
FIG. 12 is a schematic diagram of an optical transfer function MTF of the reflective eyepiece optical system according to Example 3 of the present invention.

FIG. 9 is an optical path diagram of the optical system of Example 3, which includes a first lens group T1, and a first optical element L1 and a second lens group T2 for transmitting and reflecting light from a miniature image displayer IMG; the second lens group T2 includes an optical reflection surface S2 which is an optical surface farthest from a human eye viewing side in the second lens group T2; the optical reflection surface S2 is concave to the human eye viewing side; the first optical element L1 reflects the light refracted by the first lens group T1 to the second lens group T2, and then transmits the light refracted, reflected and then refracted by the second lens group T2 to the human eyes EYE.

The effective focal length $f_w$ of the eyepiece optical system is −9.29, the effective focal length $f_1$ of the first lens group T1 is 7.64, the effective focal length $f_2$ of the second lens group T2 is 20, the effective focal length $f_{S2}$ of the optical reflection surface S2 is 9.85, the distance $d_1$ along the optical axis between the first optical element L1 and the second lens group T2 is 23.22, and the distance $d_2$ along the optical axis between the first optical element L1 and the first lens group T1 is 22.37, wherein the first lens group T1 includes a first sub-lens group $T_{11}$ and a second sub-lens group T12, both the first sub-lens group T11 and the second sub-lens group T12 are positive lens groups, and the first sub-lens group T11 is composed of two lenses which are a first lens T111 away from the miniature image displayer IMG side and a second lens T112 close to the miniature image displayer IMG side; and the first lens T111 is a negative lens, and the second lens T112 is a positive lens. The second sub-lens group T12 is composed of one lens, wherein the second sub-lens group T12 includes a third lens T121 adjacent to the first sub-lens group T11; and the third lens T121 is a positive lens. The second lens group T2 is composed of two lenses, wherein the second lens group T2 includes a fourth lens T21 and a fifth lens T22 arranged sequentially along the incident direction of the optical axis of the human eyes EYE, the optical reflection surface S2 is located on the optical surface of the fourth lens T21 away from the human eyes EYE, and the optical reflection surface S2 is concave to the viewing direction of the human eyes EYE.

The effective focal length $f_{11}$ of the first sub-lens group T11 is 10.86, the effective focal length $f_{111}$ of the first lens T111 is −28.66, the effective focal length $f_{12}$ of the second sub-lens group T12 is 30.19, and the effective focal length $f_{21}$ of the fourth lens T21 is 19.55. Then $f_1/f_w$ is −0.82, $f_2/f_w$ is −2.15, $f_{11}/f_1$ is 1.42, $f_{111}/f_{11}$ is −2.64, $f_{12}/f_1$ is 3.95, $f_{121}$ is 30.19, $f_{S2}/f_2$ is 0.499, $d_2/d_1$ is 0.96, and $\lambda_1$ is 80°.

FIGS. 10, 11a, 11b and 12 are respectively a dot array diagram, a field curvature diagram, a distortion diagram and a transfer function MTF curve graph, which reflect that the lights of respective view fields in this example has high resolution and small optical distortion in the unit pixel of the image plane (the miniature image displayer IMG), the resolution per 10 mm per unit period reaches more than 0.9, the aberration of the optical system and the image drift are well corrected, and a display image of uniformity and high optical performance can be observed through the eyepiece optical system.

Example 4

The eyepiece design data of Example 4 is shown in Table 4 below:

between the first optical element L1 and the first lens group T1 is 15, wherein the first lens group T1 includes a first sub-lens group T11 and a second sub-lens group T12, both the first sub-lens group T11 and the second sub-lens group T12 are positive lens groups, and the first sub-lens group T11 is composed of two lenses which are a first lens T111 away from the miniature image displayer IMG side and a second lens T112 close to the miniature image displayer IMG side; and the first lens Till is a negative lens, and the second lens T112 is a positive lens. The second sub-lens group T12 is composed of one lens, wherein the second sub-lens group T12 includes a third lens T121 adjacent to the first sub-lens group T11; and the third lens T121 is a positive lens. The second lens group T2 is composed of one lens which is a fourth lens T21, and an optical reflection surface S2 is arranged on the optical surface of the fourth lens T21 away from the human eyes. An effective focal length $f_{11}$ of the first sub-lens group T11 is 11.3, $f_{12}$ is 4.68, and an effective focal length $f_{111}$ of the first lens T111 is −12.53. Then $f_1/f_w$ is −0.51, $f_2/f_w$ is −1.13, $f_{11}/f_1$ is 1.40, $f_{111}/f_{11}$ is −1.11, $f_{12}/f_1$ is 0.58, $f_{121}$ is 5.84, $d_2/d_1$ is 1, and $\lambda_1$ is 56°.

FIGS. 14, 15a, 15b and 16 are respectively a dot array diagram, a field curvature diagram, a distortion diagram and a transfer function MTF curve graph, which reflect that the lights of respective view fields in this example has high resolution and small optical distortion in the unit pixel of the image plane (the miniature image displayer IMG), the resolution per 10 mm per unit period reaches more than 0.9,

TABLE 4

| Surface | Curvature radius (mm) | Thickness (mm) | Refractive index | Abbe number | Net caliber (mm) | Cone coefficient |
|---|---|---|---|---|---|---|
| Diaphragm | Infinity | 37 | | | 6 | |
| 2 | 24.75482 | 1 | 1.639081 | 23.28987 | | −0.6579222 |
| 3 | 24.75482 | −14 | | reflection | 18.62021 | −0.6579222 |
| 4 | 24.75482 | −1 | | | | −0.6579222 |
| 5 | Infinity | 14.99967 | | reflection | 12.51195 | |
| 6 | −20.92172 | 7.297555 | 1.639081 | 23.28987 | 5.821106 | 27.88114 |
| 7 | 4.010729 | 0.2559976 | | | 5.748953 | −1.742569 |
| 8 | 4.635192 | 2.632533 | 1.6779 | 54.896588 | 5.833988 | −1.991904 |
| 9 | −8.122444 | 3.409442 | | | 5.949331 | −0.1787041 |
| 10 | 11.03583 | 7.869539 | 1.6516 | 58.416296 | 6.548139 | |
| 11 | 15.03463 | 7.25431 | | | 5.512029 | |
| Image plane | Infinity | | | | 5.630769 | |

Figure 13:
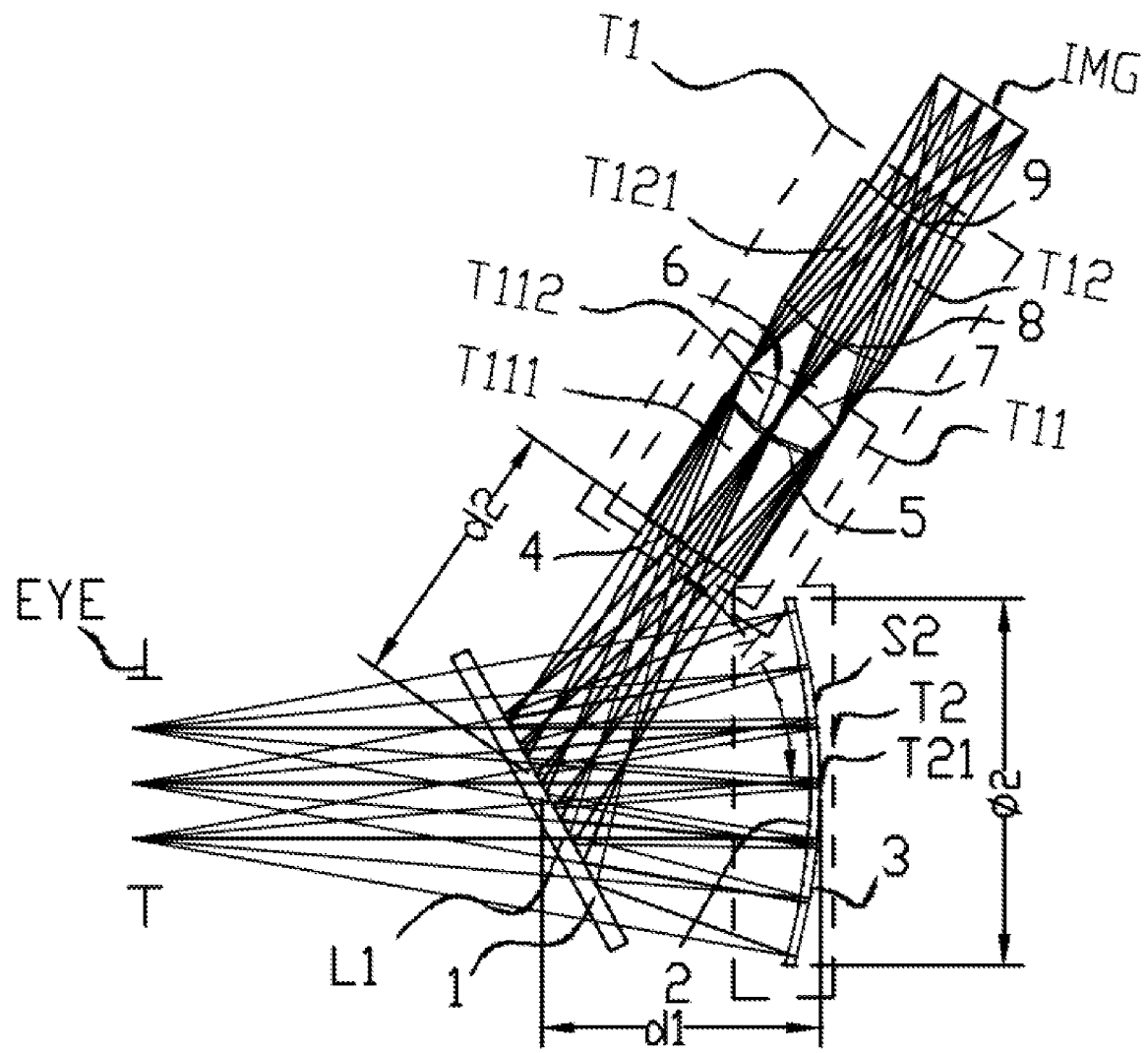
FIG. 13 is an optical path diagram of a reflective eyepiece optical system according to Example 4 of the present invention.
Figure 14:
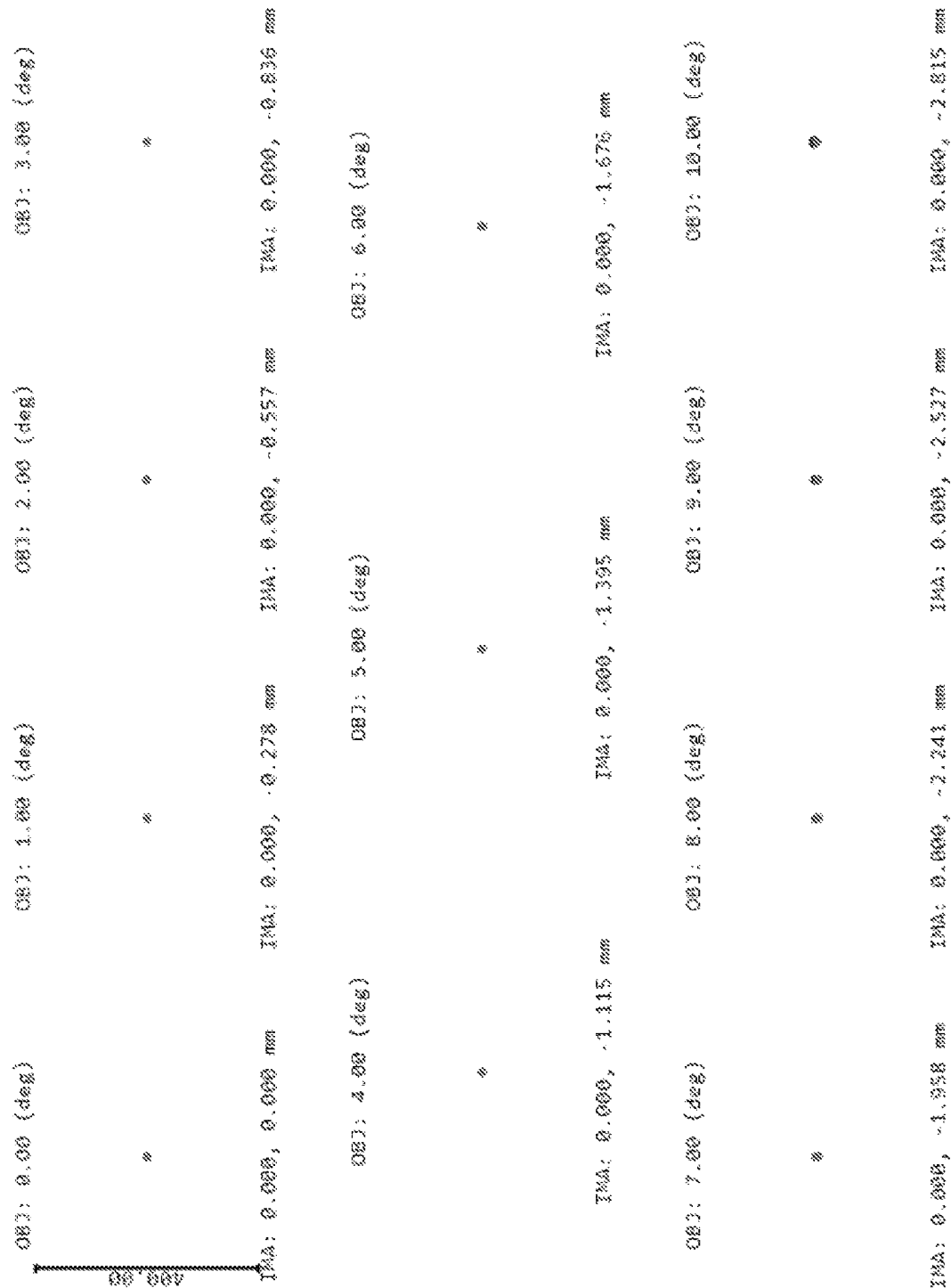
FIG. 14 is a schematic diagram of a dot array diagram of the reflective eyepiece optical system according to Example 4 of the present invention.
Figure 15A:
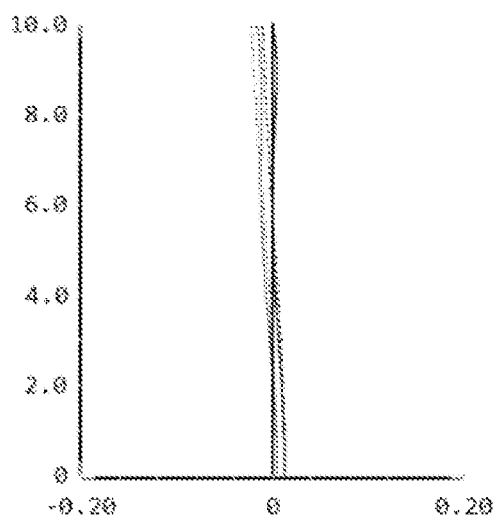
FIG. 15a is a schematic diagram of a field curvature of the reflective eyepiece optical system according to Example 4 of the present invention.
Figure 15B:
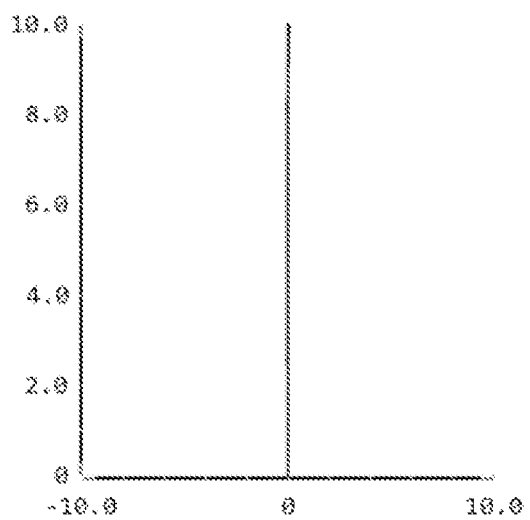
FIG. 15b is a schematic diagram of a distortion of the reflective eyepiece optical system according to Example 4 of the present invention.
Figure 16:
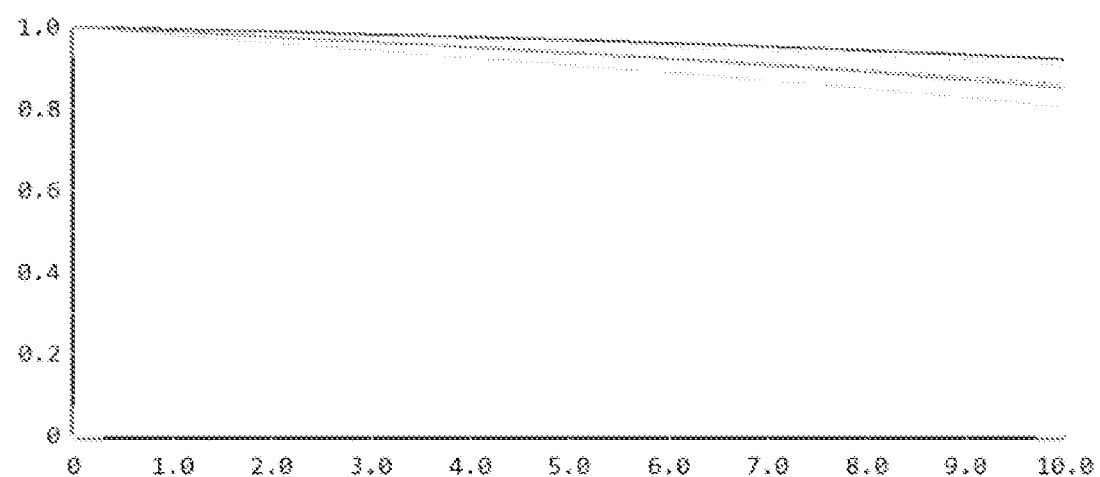
FIG. 16 is a schematic diagram of an optical transfer function MTF of the reflective eyepiece optical system according to Example 4 of the present invention.

FIG. 13 is an optical path diagram of the optical system of Example 4, which includes a first lens group T1, and a first optical element L1 and a second lens group T2 for transmitting and reflecting light from a miniature image displayer IMG; the second lens group T2 includes an optical reflection surface S2 which is an optical surface farthest from a human eye viewing side in the second lens group T2; the optical reflection surface S2 is concave to the human eye viewing side; the first optical element L1 reflects the light refracted by the first lens group T1 to the second lens group T2, and then transmits the light refracted, reflected and then refracted by the second lens group T2 to the human eyes EYE.

The effective focal length $f_w$ of the eyepiece optical system is −15.94, the effective focal length $f_1$ of the first lens group T1 is 8.1, the effective focal length $f_2$ of the second lens group T2 is 18, the distance di along the optical axis between the first optical element L1 and the second lens group T2 is 15, and the distance $d_2$ along the optical axis the aberration of the optical system and the image drift are well corrected, and a display image of uniformity and high optical performance can be observed through the eyepiece optical system.

All the data of the aforementioned Examples 1 to 4 meet the parameter requirements recorded in the Summary, and the results are shown in Table 5 below:

TABLE 5

| | $f_1/f_w$ | $f_2/f_w$ | $f_{11}/f_1$ | $f_{111}/f_{11}$ | $f_{12}/f_1$ |
|---|---|---|---|---|---|
| Example 1 | −1.02 | −0.71 | 0.67 | −2.75 | 1.12 |
| Example 2 | −1.01 | −1.54 | 1.19 | −0.97 | 1.17 |
| Example 3 | −0.82 | −2.15 | 1.42 | −2.62 | 3.95 |
| Example 4 | −0.51 | −1.13 | 1.4 | −1.11 | 0.58 |

The present application provides a head-mounted near-to-eye display device, including a miniature image displayer, and further including the reflective eyepiece optical system according to any one of the foregoing content; and the eyepiece optical system is located between the human eyes and the miniature image displayer.

Preferably, the miniature image displayer is an organic electroluminescent device.

Preferably, the head-mounted near-to-eye display device includes two identical reflective eyepiece optical systems.

To sum up, the first lens group of the reflective eyepiece optical system of the aforementioned examples of the present invention includes two sub-lens groups which are the first sub-lens group and the second sub-lens group, and the effective focal lengths of the first sub-lens group and the second sub-lens group adopt a combination of positive and positive, which fully corrects the aberration of the system and improves the optical resolution of the system. More importantly, with the transmission and reflection properties of the first optical element and the second lens group which includes an optical reflection surface, the optical path is effectively folded, which reduces the overall size of the eyepiece optical system, and improves the possibility of subsequent mass production. On the basis of miniaturization, cost and weight reduction for the article, the aberration of the optical system is greatly eliminated, and the basic optical indicators are also improved to ensure high imaging quality and increase the size of the picture angle. Thus an observer can watch large images of full frame, high definition and uniform image quality without any distortion and get visual experience of high liveness via the present invention, and the present article is suitable for head-mounted near-to-eye display devices and similar devices.

It should be understood that improvements or changes can be made by those of ordinary skills in the art according to the aforementioned description, and all these improvements and changes should fall within the claimed scope of the appended claims of the present invention.

What is claimed is:

1. A reflective eyepiece optical system, which is composed of a first lens group, and a first optical element and a second lens group for transmitting and reflecting light from a miniature image displayer; the second lens group comprises an optical reflection surface which is an optical surface farthest from a human eye viewing side in the second lens group; the optical reflecting surface is concave to human eyes; the first optical element reflects the light refracted by the first lens group to the second lens group, and then transmits the light refracted, reflected and then refracted by the second lens group to the human eyes;

an effective focal length of the eyepiece optical system is $f_w$, an effective focal length of the first lens group is $f_1$, an effective focal length of the second lens group is $f_2$, and $f_w$, $f_1$, and $f_2$ satisfy the following relations (1) and (2):

$$f_1/f_w < -0.50 \quad (1);$$

$$f_2/f_w < -0.70 \quad (2);$$

the first lens group is composed of a first sub-lens group and a second sub-lens group arranged the total axial coaxially and sequentially along an optical axis direction from a human eye viewing side to a miniature image displayer side; an effective focal length of the first sub-lens group is $f_{11}$, which is a positive value; an effective focal length of the second sub-lens group is $f_{12}$, which is a positive value; and $f_{11}$, $f_{12}$ and $f_1$ satisfy the following relations (3) and (4):

$$0.66 < f_{11}/f_1 \quad (3);$$

$$0.57 < f_{12}/f_1 \quad (4);$$

the first sub-lens group is composed of two lenses which are a first lens away from the miniature image displayer side and a second lens close to the miniature image displayer side respectively; the first lens is a negative lens; the second lens is a positive lens; the second sub-lens group is composed of a third lens adjacent to the first sub-lens group; and the third lens is a positive lens.

2. The reflective eyepiece optical system according to claim 1, wherein the distance along the optical axis between the optical surface of the first optical element away from the human eye viewing side and the optical reflection surface in the second lens group is $d_1$, the distance along the optical axis between the optical surface of the first optical element away from the human eye viewing side and the optical surface in the first lens group closest to the human eye viewing side is $d_2$, and $d_1$ and $d_2$ satisfy the following relation (5):

$$0.69 < d_2/d_1 \quad (5).$$

3. The reflective eyepiece optical system according to claim 1, wherein a maximum effective optical caliber of the second lens group is $\varphi_2$, which satisfies the following relation (6):

$$\varphi_2 < 70 \text{ mm} \quad (6).$$

4. The reflective eyepiece optical system according to claim 1, wherein an effective focal length of the first lens is $f_{111}$, and the effective focal length of the first sub-lens group is $f_{11}$ and $f_{111}$ and $f_{11}$ satisfy the following relation (7):

$$f_{111}/f_{11} < -0.96 \quad (7).$$

5. The reflective eyepiece optical system according to claim 1, wherein an optical surface of the third lens close to the miniature image displayer side is concave to the miniature image displayer; and an effective local length of the third lens is $f_{121}$, which satisfies the following relational (8):

$$5.83 < f_{121} \quad (8).$$

6. The reflective eyepiece optical system according to claim 1, wherein the second lens group comprises a fourth lens adjacent to the first optical element; and the optical reflection surface is located on an optical surface of the fourth lens away from the human eyes.

7. The reflective eyepiece optical system according to claim 1, wherein the second lens group is composed of a fourth lens and fifth lens adjacent to the first optical element; the fourth lens and the fifth lens are arranged sequentially along an incident direction of the optical axis of the human eyes; and the optical reflection surface is located on an optical surface of the fourth lens away from the human eyes.

8. The reflective eyepiece optical system according to claim 1, wherein an effective focal length of the optical reflection surface is $f_{S2}$, which satisfies the following relation (9):

$$0.46 \leq f_{S2}/f_2 \leq 1.0 \quad (9).$$

9. The reflective eyepiece optical system according to claim 1, wherein the first optical element is a planar transflective optical element; and a reflectivity of the first optical element is $Re_1$, which satisfies relation (10):

$$20\% < Re_1 < 80\% \quad (10).$$

10. The reflective eyepiece optical system according to claim 1, wherein a reflectivity of the optical reflection surface is $Re_2$, which satisfies relation (11):

$$20\% < Re_2 \qquad (11).$$

11. The reflective eyepiece optical system according to claim 1, wherein the effective focal length $f_1$ of the first lens group, the effective focal length fit of the first sub-lens group, the effective focal length $f_{12}$ of the second sub-lens group and the effective focal length $f_{111}$ of the first lens further satisfy the following relations (12), (13) and (14):

$$0.67 \le f_{11}/f_1 \le 1.42 \qquad (12);$$

$$-2.64 \le f_{111}/f_{11} \le -0.97 \qquad (13);$$

$$0.58 \le f_{12}/f_1 \le 4.54 \qquad (14).$$

12. The reflective eyepiece optical system according to claim 1, wherein an included angle of the optical axis between the first lens group and the second lens group is $\lambda_1$, which satisfies relation (15):

$$55° < \lambda_1 < 120° \qquad (15).$$

13. The reflective eyepiece optical system according to claim 6, wherein the first lens group comprises one or more even-order aspherical face shapes; the optical surfaces of the fourth lens are all even-order aspherical face shapes; and the optical reflection surface is an even-order aspherical face shape.

14. The reflective eyepiece optical system according to claim 13, wherein the even-order aspherical face shape satisfies the following relation (16):

$$z = \frac{cr^2}{1 + \sqrt{1-(1+k)c^2 r^2}} + a_2 r^2 + a_4 r^4 + a_6 r^6 + \ldots ; \qquad (16)$$

wherein z is a vector height of the optical surface, c is a curvature at an aspherical vertex, k is an aspherical coefficient, α2, 4, 6 . . . are coefficients of various orders, and r is a coordinate of the distance from a point on a curved surface to an optical axis of a lens system.

15. The reflective eyepiece optical system according to claim 1, wherein the material of each lens in the second lens group is an optical plastic material.

16. A head-mounted near-to-eye display device, comprising a miniature image displayer, wherein it further comprises the reflective eyepiece optical system according to claim 1; and the eyepiece optical system is located between human eyes and the miniature image displayer.

17. The head-mounted near-to-eye display device according to claim 16, wherein the miniature image displayer is an organic electroluminescent device.

18. The head-mounted near-to-eye display device according to claim 16, wherein the head-mounted near-to-eye display device comprises two identical reflective eyepiece optical systems.

* * * * *